INVENTOR.
J. LEAVITT ANDERSON
BY
Adams & Amayna
ATTORNEYS

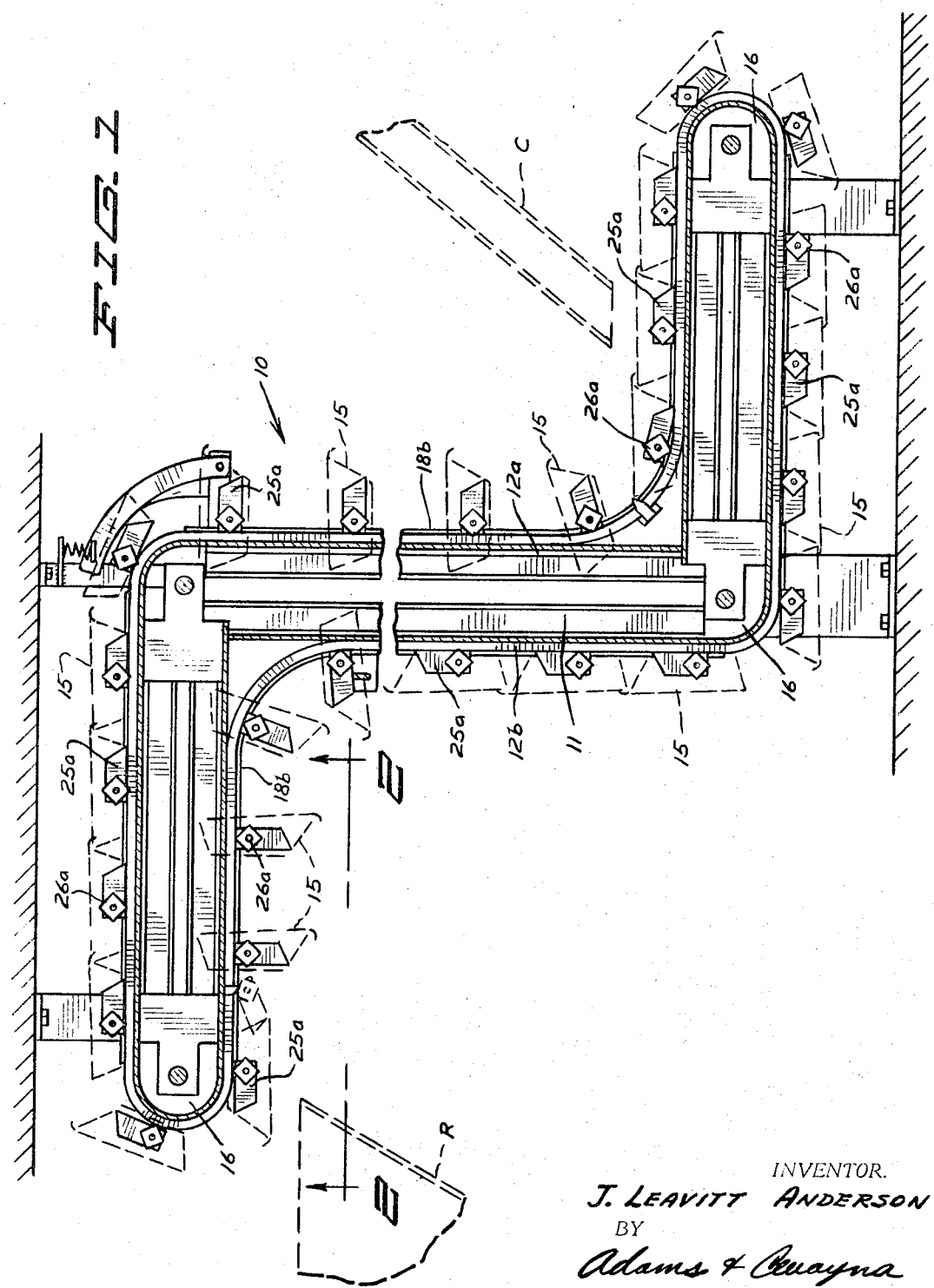

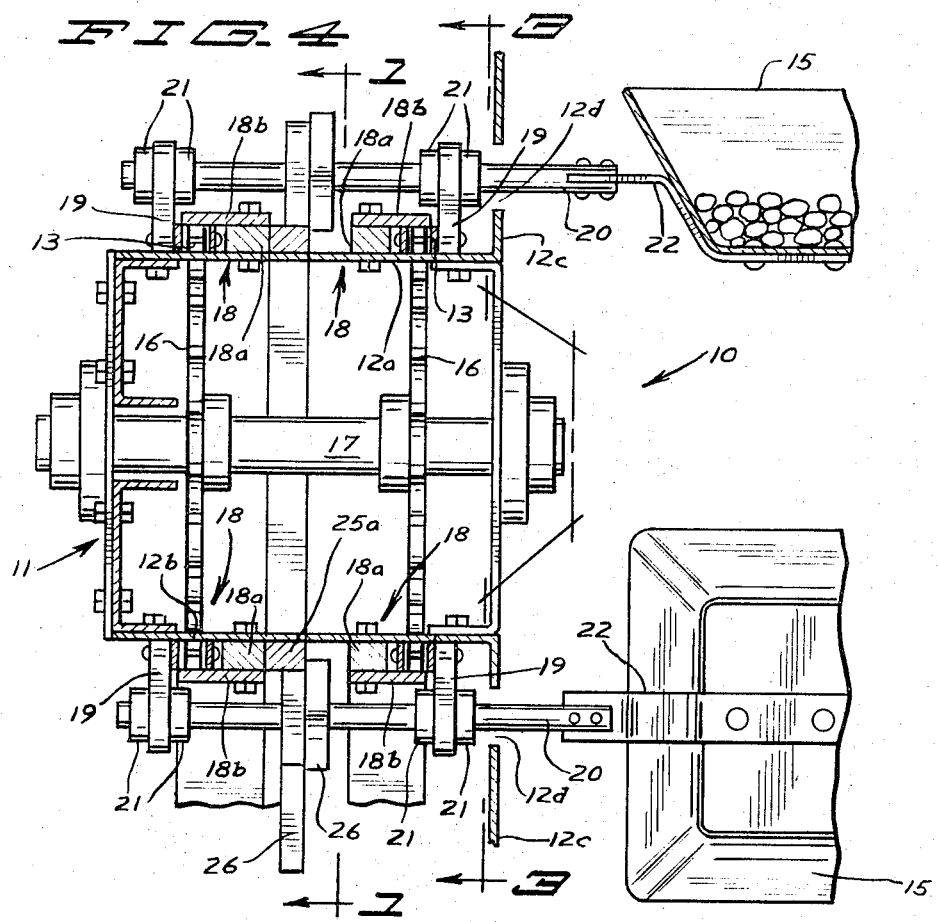

Patented Apr. 4, 1967

3,312,333
ATTITUDE CONTROLLED CONVEYOR
J. Leavitt Anderson, 2501 Crosby Road,
Wayzata, Minn. 55391
Filed Oct. 23, 1965, Ser. No. 503,425
7 Claims. (Cl. 198—145)

This invention relates generally to conveying apparatus and more particularly to a conveying device wherein individual conveyor elements are provided to convey material and wherein the attitude of each of these elements is positively controlled throughout the travel of the unit.

Various conveyor mechanisms are commonly known which include a plurality of material carrying elements such as collector pans or the like wherein the attitude of the pans is controlled at certain portions of the conveyors travel. For an example of this control, various devices are known which include means for dumping the carrying pans at a particular discharge point. It has, however, been a major difficulty in the past to provide a conveyor mechanism which positively controls the attitude of the conveyor pans throughout the entire travel of the unit such that the pans may be held in any desired position which will permit the travel of the conveyor to be directed upwardly, downwardly or in any other desired direction while positively maintaining the material carried thereon in a proper disposition, for example to prevent spilling.

In designing conveyor systems it is often necessary to provide a means of access to the material being conveyed and many of the now available attitude controlled conveyors provide propelling means on both sides of or directly below the conveyor pan structures. These propelling means do not permit access to the conveyor pans which in many applications is of primary importance as the conveying chains or conveying mechanism prevents such access. Applicant however through the device as provided herein provides a unique mounting structure for the conveyor pans wherein unobstructed access is provided to at least one side of the pan to permit an operator or user of the conveyor to service, fill or work on the material being conveyed therepast.

In many conveyor applications it is also desirable to maintain a certain degree of cleanliness and it is commonly known that the propelling mechanisms being chains or the like are generally dirty and greasy or tend to accumulate dirt and grease. With the device as provided herein applicant provides an arrangement wherein the propelling mechanism for the individual conveying pans is substantially enclosed with only a pan support member extending without the propelling mechanism such that a sealed condition will essentially exist which will thereby eliminate such cleanliness problems.

Another consideration in the device as provided herein is that of strength. The mounting and carrying structure as provided by applicant provides a certain degree of strength and rigidity to the pans being conveyed while permitting complete flexibility in the attitude control thereof. With the commonly known conveyors which as previously stated convey from either the sides of the pans or from the bottom thereof the strength factor is not necessarily a problem but the positioning of these conveying mechanisms presents strength problems should the size of the conveying chains or the like be limited by the particular application.

In applicant's invention the attitude control mechanism for each of the individual pan conveyors is positioned between the support mechanisms for the conveyed pan and therefore positive control positioning is obtained in that it is impossible for the control mechanisms to be moved out of registration with one another.

It is therefore an object of applicant's invention to provide a unique conveyor mechanism wherein the conveyor may consist of a plurality of individual pan members whose attitude may be controlled throughout the entire travel of the conveyor.

It is a further object of applicant's invention to provide a unique conveyor pan mounting structure for mounting individual conveyor pans or the like upon a conveyor unit, which mounting structure will permit unimpeded access to the pan thereby allowing operations to be performed on the material carried on the conveyor.

It is a further object of applicant's invention to provide a control mechanism for individual conveyor pans of a conveyor system wherein the attitude and operation of each of the pans may be completely controlled during the conveyors travel and wherein individual mechanical operations may be performed upon the individual pans due to the positive positioning arrangement between the control structure and the structure which is provided for each of the pans operated in response to the control.

It is a further object of applicant's invention to provide a conveyor system wherein a plurality of individual conveyor pans or the like are provided and which are mounted in a fashion to permit travel in various directions while maintaining the material contained in the individual pan elements in proper relation to the path being traveled.

These and other objects and advantages of my invention will more fully appear from the following description made in connection with the accompanying drawings, wherein like reference characters refer to the same or similar parts throughout the several views, and in which:

FIG. 1 is a view illustrating an entire conveyor structure provided to deliver material from one level to a second upwardly displaced level and particularly taken along line 1—1 of FIG. 4;

FIG. 4 is an end view taken from the upper end of FIG. 1.

Figure 3:
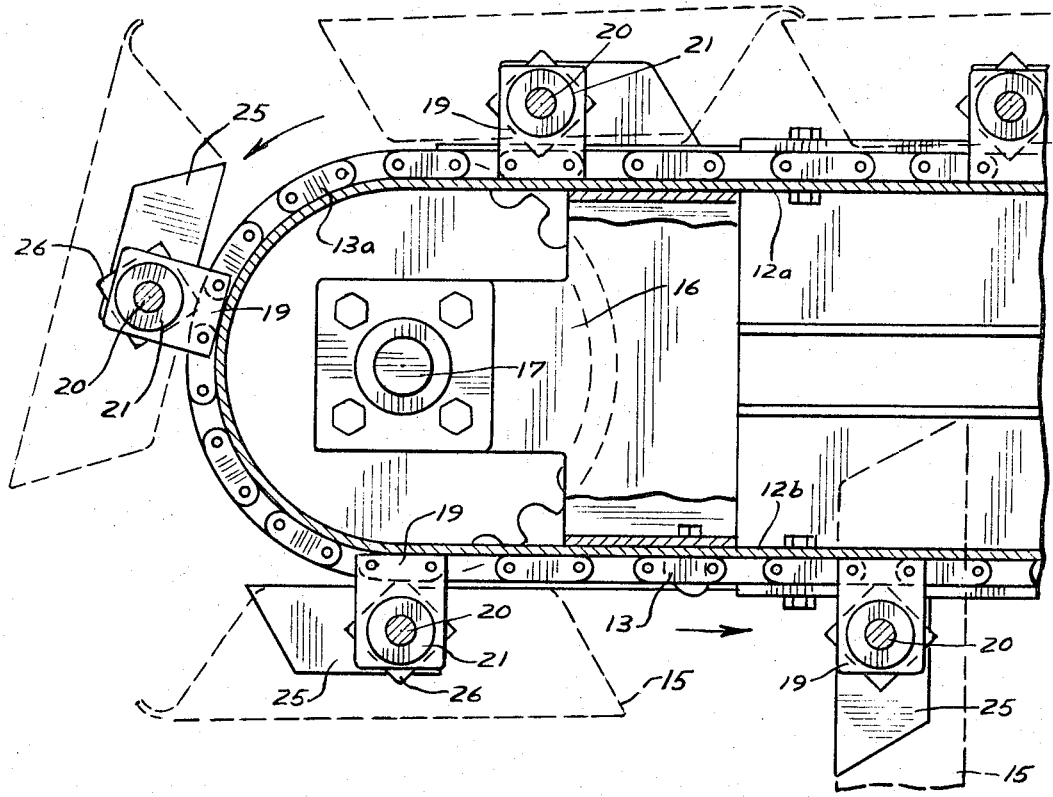
FIG. 3 is a vertical section taken substantially along line 3—3 of FIG. 4 illustrating the cornering effect of the conveyor.
Figure 2:
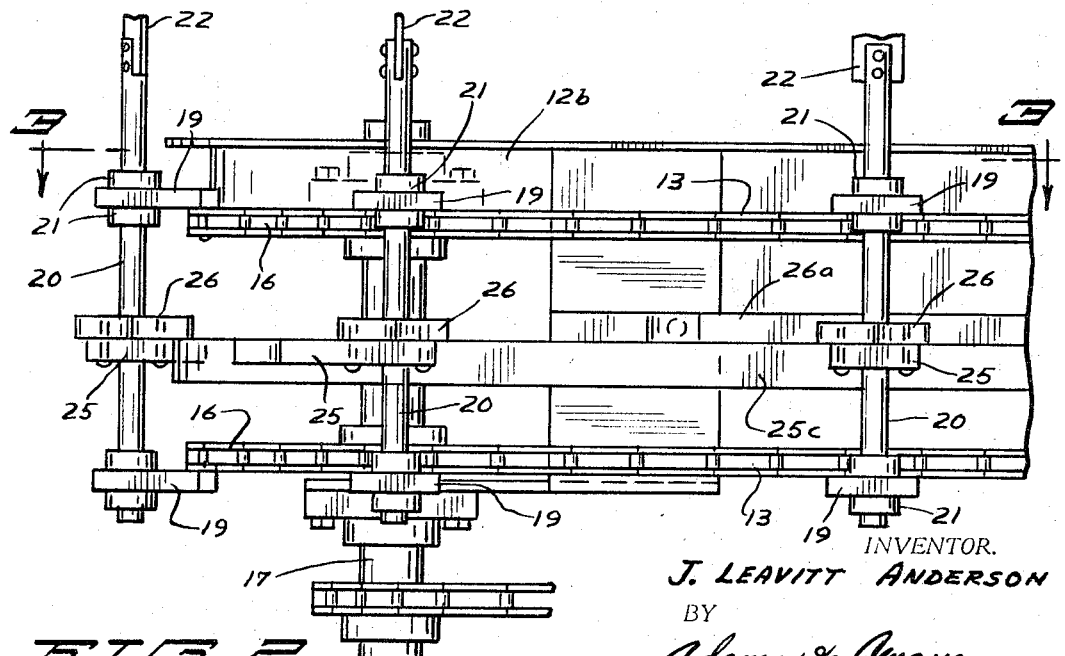
FIG. 2 is a horizontal section taken substantially along line 2—2 of FIG. 1.

In accordance with the accompanying drawings, and as best illustrated in FIG. 1 a conveyor embodying the concepts of applicant's invention includes means for transporting material in and along paths in separate planes. For example, as shown in FIG. 1 material is received from a discharge chute C at one level and is raised upwardly therefrom to a second level to be discharged into a receiving tank R. The motion in this illustration then is in both a vertical and horizontal plane and it should be initially explained that this conveyor is not particularly designed to be arranged in curvilinear fashion or the like but rather is arranged for horizontal, vertical or combined horizontal and vertical travel with the primary object of the invention being a method for completely controlling the attitude of the various material conveying buckets as they are conveyed.

As illustrated in FIG. 1 a support structure generally designated 11 is provided which will be set up in the general direction for which material flow is required. This support structure 11 is best illustrated in FIG. 4 and includes a pair of spaced support members 12a, 12b, one of which supports 12a provides the upper or delivery run of the unit with the other 12b providing the lower or return run. Intermediate spacer supports are provided to maintain the relation between the runs of the conveyor.

The upper 12a and lower 12b run portions of the unit provide direction control for the conveyed elements and positively establish the direction of travel which will be followed by the propelling and conveyed mechanism.

A pair of conveyor chains 13—13 are provided spaced across the conveyor unit and extend entirely therearound to provide the propelling force for the conveyor pans 15 which are conveyed thereby. In order to drive the chains, various sprockets 16 or the like must be provided attached to a source of rotary power and may also be provided at the points of direction change such as corners. In the form shown sprockets 16 are provided for both chains 13—13 and may be mounted on common drive shafts 17 which shafts 17 will be pivotally mounted within the support structure 11 of the conveyor.

As illustrated in FIG. 4 chain hold down or guide members 18 are provided to partially surround and hold chains 13—13 as the chains travel about the conveyor path and in the form shown these hold down members 18 may consist of a spacer block 18a with a cantilevered cover member 18b arranged and attached thereon such that cantilever cover 18b will substantially override the drive chains 13 and hold the same in proper driving relation to the sprockets 16 and supports 12a, 12b.

The conveying pans 15 are attached to the chain elements 13 through a unique attachment mechanism. In the form shown a pair of trunnion elements 19—19 are provided for each pan 15 and are secured along the chains 13—13 to at least certain of the chain links 13a. Trunnion members 19—19 are arranged to be in aligned relation with one another such that an in-line support may be provided for each of the pan elements 15. A single unitary shaft member 20 is provided for each of the pans 15 and this shaft member 20 is rotatably mounted within the trunnion elements 19 and may be captured thereto by providing blocking or locking caps 21—21 on each side of the respective trunnion elements 19. It should be noted that this shaft 20 is rotatably held within the trunnions 19—19 to permit free rotation of the pan and to thereby permit the attitude control thereof through the incorporation of additional elements hereinafter explained.

The attachment mechanism for securely arranging the pans 15 onto the individual shafts 20 includes a bracket member 22 having one end thereof attached to an outwardly extending end of the shaft 20 and which is securely attached on the other end thereof to the bottom of the pan 15 substantially at the center thereof such that ease of control and manipulation of the individual pans 15 is obtained. It should be obvious that in the form shown, although a pan 15 is provided on only one end of shaft 20 that this pan could be either placed on the opposite end of the shaft or dual pans could be placed on any of the shafts. It should also be noted and as best illustrated in FIG. 4 that a portion 12c of the support structures 12a, 12b may be provided with an opening 12d therein which opening again will follow the path of the conveyor and will provide an access opening for the shaft 20 to extend outwardly from the driving portion of the conveyor. With this opening 12d it would be possible to substantially enclose the driving and control portion of the conveyor thereby eliminating the dirt problem common thereto.

The control mechanism for maintaining the attitude of each of the individual pans 15 is provided intermediate the trunnion members 19—19 and is securely affixed to the shaft 20 of the individual pans. In the form shown a pair of cam followers 25–26 are provided on each pan shaft 20 and are securely attached thereto for positive control of the shaft 20 and attached pan 15. These cams 25–26 of course are specifically designed to perform the functions appropriate to the delivery of material and the shape of these various cams will be altered in accordance with the path being traveled and the necessity of maintaining attitudes of the pans 15. Generally, however, a first cam member 25a is provided fixedly attached to the support structure 11 of the unit and in the form shown this cam 25a extends substantially around the entire path of the unit. The presence of cam 25a and cam follower 25 of course would permit control of the attitude of the pans 15 completely around the conveyor unit. However, in the form shown a second cam follower 26 is provided for an additional mechanical attitude change of the pans 15 and likewise further members could be provided adjacent to either of the cam followers 25–26 to further control various mechanical actions to be transferred to the pan. For example, a rack could be fixedly affixed to the support structure 11 and a pinion could be arranged on the shaft 20 such that as the chains 13—13 drove the pan 15 thereover, engagement would be afforded between the rack and pinion and the pan could be completely rotated. Naturally using a rotary motion would require pan 15 to be a substantially enclosed carrier. Likewise there are other mechanical actions which are commonly known and which could be obtained through the use of various cams mounted in proper position on the conveyor unit with the proper cam follower being mounted on the shaft 20.

It should be noted however that in any type of cam and cam follower situation to obtain an attitude control or mechanical action it is necessary to positively hold the follower and cam in proper relation to one another. It is this aspect that is important to this invention and it is felt to be unique with the particular structure as provided by applicant. The double trunnion system affords proper positioning between the cams and the cam followers while permitting the pan to be completely free around three sides thereof. In comparison, now available equipment places the control for the attitude of the pan directly on the pan itself which of course impedes access to all possible sides of the pan.

To follow the action of the conveyor unit as shown in FIG. 1 it should be sufficient to state that coordination and spacing of the cams 25, 26 along the entire length of travel will permit constant attitude control of the material carrying pans. The positioning and type of cams and cam followers used in any one installation will depend upon the effect desired but the end effect is to provide a positive mounting structure which permits positive attitude control of the conveying elements of a conveyor.

It should be obvious that applicant has provided a new and unique conveyor structure which permits complete attitude control of the various conveyor pans conveyed thereby wherein the attitude control mechanism may be completely isolated from the material carrying portion of the conveyor which will permit free access to the material conveyor pan.

Likewise it should be obvious that the structure as provided herein provides a substantially rigid mounting arrangement for the various conveyor pans and that a double load carrying structure is provided.

It will, of course, be understood that various changes may be made in the form, details, arrangements and proportion of parts without departing from the scope of my invention, which generally stated consists in the matter set forth in the appended claims.

What I claim is:

1. A conveyor system wherein attitude of individual conveying elements may be controlled including:
   (a) a support structure defining a conveyor path;
   (b) means arranged on at least selected portions of said support structure for supporting a drive device thereon;
   (c) a drive device arranged to provide a continuous driving force around said conveyor path and supported thereon by said support means;
   (d) a plurality of individual conveyor elements for carrying material therealong;
   (e) mounting means for rotatably mounting said conveyor elements on said drive device to position the conveyor elements in transverse relation spaced outwardly from the conveyor support structure;
   (f) at least one cam follower fixedly attached to said mounting means for controlling the attitude of the conveying element;

(g) cam members arranged on at least selected portions of said support structure for engagement with said cam followers whereby the attitude of the conveyor element is controlled when said cam and follower are in registration; and (h) a source of driving power for said drive device.

2. A conveyor system wherein attitude of individual conveying elements may be controlled including:

(a) a support structure defining a conveyor path;

(b) a support means arranged on at least selected portions of said support structure for supporting a drive mechanism thereon;

(c) a pair of continuous driving elements arranged on said conveyor path and supported thereby on said support means, said drive elements being spaced transversely across the width of the structure;

(d) a plurality of conveyor elements having a mounting portion thereon for conveying material;

(e) mounting means on each of said drive elements in aligned transverse relation to receive said mounting portion of said conveying element rotatably therein and support said element in transverse spaced relation from the conveyor structure;

(f) at least one position controlling member on said mounting portion of said conveyor element;

(g) position controlling means on at least selected portions of said support structure arranged for registration with the position controlling member on said conveyor element to control the attitude thereof; and (h) a source of driving power for said driving elements.

3. The structure set forth in claim 2 wherein said driving elements include a pair of continuous chain elements with said mounting means arranged on respective links thereof.

4. The structure set forth in claim 3 and capturing means overlying at least a portion of said chain to hold the same on said support means and maintain said position controlling means in registration.

5. The structure set forth in claim 2 wherein the mounting portion of said conveyor elements includes at least a singular rod member secured to said conveyor element to position said conveyor element in transverse outward spaced relation to the support structure.

6. The structure set forth in claim 5 and cover means surrounding said support structure and having an access slot therein permitting said rod member to extend outwardly therefrom for supporting said conveyor elements.

7. The structure set forth in claim 2 wherein said position controlling means and elements are arranged intermediate said driving elements.

References Cited by the Examiner

UNITED STATES PATENTS 3,055,486  9/1962  Meyer _____ 198—145
3,067,859  12/1962  Jacobsen _____ 198—145

EVON C. BLUNK, *Primary Examiner.*

RICHARD E. AEGERTER, *Examiner.*